United States Patent
Ogborn et al.

(10) Patent No.: US 8,049,141 B2
(45) Date of Patent: Nov. 1, 2011

(54) METHOD OF RATING A STICK ELECTRODE

(75) Inventors: Jonathan Sterling Ogborn, Concord Township, OH (US); Robert J. Weaver, Concord, OH (US); Jon P. Chiappone, Willougby, OH (US); Craig B. Dallam, University Heights, OH (US)

(73) Assignee: Lincoln Global, Inc., City of Industry, CA (US)

( * ) Notice: Subject to any disclaimer, the term of this patent is extended or adjusted under 35 U.S.C. 154(b) by 651 days.

(21) Appl. No.: 11/879,564

(22) Filed: Jul. 18, 2007

(65) Prior Publication Data

US 2009/0020514 A1 Jan. 22, 2009

(51) Int. Cl.
B23K 9/00 (2006.01)
B23K 33/00 (2006.01)
B23K 35/30 (2006.01)
B23K 9/10 (2006.01)
B23K 9/12 (2006.01)
B23K 9/06 (2006.01)

(52) U.S. Cl. ............. 219/137 R; 219/130.01; 219/130.4

(58) Field of Classification Search .............. 219/137 R, 219/137 PS, 130.01, 130.4, 137 WM, 145.1–146.52; 228/102–104; 324/536, 415–423
See application file for complete search history.

(56) References Cited

U.S. PATENT DOCUMENTS

| | | | | |
|---|---|---|---|---|
| 3,542,998 A * | 11/1970 | Huff | ......................... | 219/146.52 |
| 3,783,234 A * | 1/1974 | Russell | .................... | 219/145.23 |
| 3,783,334 A | 1/1974 | Gore et al. | | |
| 4,214,145 A * | 7/1980 | Zvanut et al. | ............ | 219/145.22 |
| 4,302,655 A * | 11/1981 | Edling | ..................... | 219/130.32 |
| 5,004,884 A * | 4/1991 | Sakaguchi et al. | .............. | 219/73 |
| 5,621,332 A * | 4/1997 | Inkpen et al. | .................. | 324/650 |
| 5,684,405 A * | 11/1997 | Rhein | ........................... | 324/551 |
| 6,031,203 A * | 2/2000 | Suzuki et al. | ............ | 219/130.01 |
| 6,703,585 B2 * | 3/2004 | Suzuki | ..................... | 219/130.01 |
| 7,642,486 B2 * | 1/2010 | Fosbinder et al. | ......... | 219/130.5 |
| 2002/0144989 A1 * | 10/2002 | Sammons et al. | ...... | 219/137 PS |
| 2002/0170899 A1 * | 11/2002 | Suzuki | ..................... | 219/130.01 |
| 2003/0052107 A1 * | 3/2003 | Suzuki | ..................... | 219/130.01 |
| 2003/0155337 A1 * | 8/2003 | Rice et al. | ................. | 219/130.21 |
| 2005/0242076 A1 * | 11/2005 | Stava et al. | ................. | 219/130.5 |
| 2006/0076330 A1 * | 4/2006 | Beistle et al. | .............. | 219/130.4 |
| 2006/0086706 A1 * | 4/2006 | Ulrich | .......................... | 219/132 |
| 2006/0231539 A1 * | 10/2006 | Katiyar et al. | ............ | 219/137 R |
| 2007/0187375 A1 | 8/2007 | Burt et al. | | |

OTHER PUBLICATIONS

International Search Report, Dec. 22, 2008.

* cited by examiner

Primary Examiner — Henry Yuen
Assistant Examiner — Hemant Mathew
(74) Attorney, Agent, or Firm — Hahn Loeser & Parks LLP

(57) ABSTRACT

A method of rating the arc maintainability of an electric arc welding stick electrode by creating an arc between the electrode and a workpiece; moving the electrode along the workpiece while maintaining the arc; decreasing either the current or the voltage until a point is reached where the arc is extinguished; determining the open circuit voltage at the point; and, rating the electrode based upon the open circuit voltage point.

27 Claims, 5 Drawing Sheets

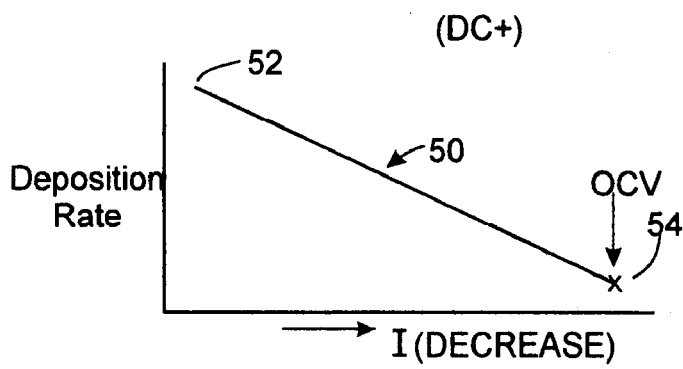
FIG. 4
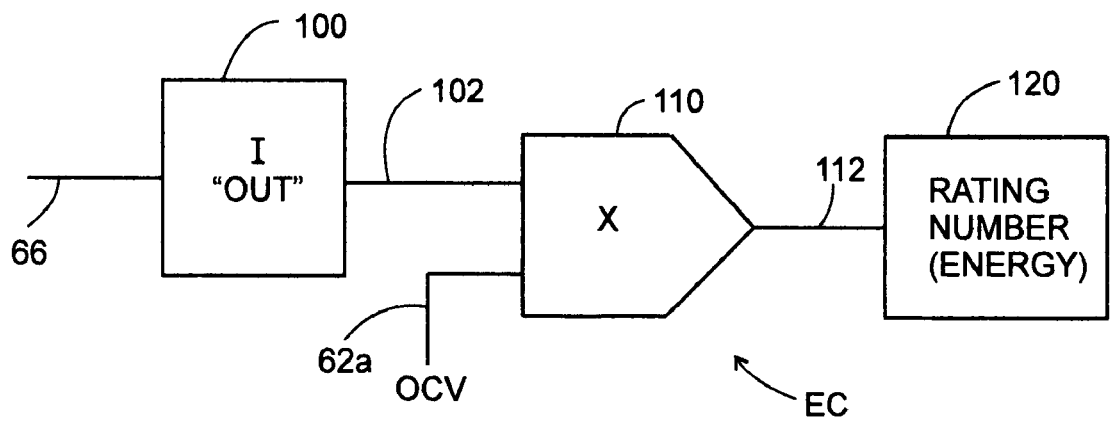
FIG. 5
FIG. 6a

METHOD OF RATING A STICK ELECTRODE

The invention relates to the art of testing a stick electrode and more particularly to a method of rating a stick electrode as to the arc maintaining characteristic of the electrode as determined by open circuit voltage.

THE INVENTION

A stick electrode includes a solid wire melted by an arc and deposited onto a workpiece. The melting operation is a function of high current and low voltage created by a power source having an elevated output voltage when the arc between the welding wire and workpiece is broken. This elevated voltage of the power source is referred to as the "open circuit voltage." It has been found that this characteristic of the power source can be used with or without the arc current to evaluate the arc sustaining quality of a welding electrode. This is especially true of a stick electrode. A stick electrode is evaluated by the present invention utilizing the open circuit characteristic of a power source to determine arc maintainability.

A stick electrode carries the fluxing system in a coating on the outside of the welding wire. The rating method compares one electrode with another electrode according to the ability to maintain a stabilized arc at low energy from the power source. Arc maintainability is a quality characteristic of a stick electrode and is tested by the novel method of the present invention.

In accordance with the present invention there is provided a method of rating the arc maintainability of a stick electrode. Such electrode has a welding wire for depositing molten metal from the wire onto a workpiece by using an arc between the electrode and the workpiece. The arc is caused by a voltage from a power source where the voltage creates the current plasma of the arc. The invention involves creating the arc between the electrode and the workpiece, moving the electrode along the workpiece while maintaining the arc, decreasing either the current or the voltage until a point is reached where the arc is extinguished, determining the open circuit voltage of the power source at that point and then rating the electrode based upon the open circuit point of the power source. One procedure for rating is to multiply the open circuit voltage by the arc current just before the open circuit point to give the lowest energy (or wattage) needed to maintain the arc.

In accordance with an aspect of the invention, the method is performed by decreasing the arc current. In another embodiment, it is performed by decreasing the arc voltage. In each instance, the open circuit voltage is determined at the time the power source no longer maintains an arc for melting the electrode in the welding process. This open circuit voltage is a characteristic of the stick electrode that indicates the ability of the electrode to maintain an arc over wide ranges of low currents and low voltages. The ability of a stick electrode to maintain an arc at low currents and low voltages is an advantage in the field.

In accordance with another aspect of the present invention, the stick electrode is rated by testing several electrodes and averaging the open circuit point determined by the main aspect of the present invention.

In accordance with still a further aspect of the invention, the rating of the stick electrode is determined by plotting the open circuit point as a curve relating to current and voltage where the quality of the electrode is determined by the area under the plotted curve with the smaller area being a higher quality welding wire. In other words, the invention rates stick electrodes by the energy (wattage) necessary to maintain a welding arc.

The primary object of the present invention is the provision of a method for rating the quality of a stick electrode, which method involves determining the open circuit voltage at the point when the arc is distinguished by either reducing the current or reducing the voltage.

Another object of the present invention is the provision of a method for rating a stick electrode which method involves the open circuit voltage of the welding operation so that the open circuit characteristic of a given electrode can be rated and/or compared with a competitive electrode.

Yet another object of the present invention is the provision of a method, as defined above, which method uses open circuit conditions to determine the lowest wattage (power) to maintain a welding arc.

These and other objects and advantages will become apparent from the following description taken together with the accompanying drawings in which:

FIG. 4 is a graph illustrating performance of the present method, primarily when the welding is DC positive and where rating is accomplished by decreasing the arc current;

FIG. 5 is a table tabulating the results of the test performed in accordance with FIG. 4;

PREFERRED EMBODIMENTS

A quality characteristic of a stick electrode is its ability to maintain an arc at low heat energy. This is also expressed as a low open circuit voltage. Heretofore, there has been no commercial rating system evaluating this important characteristic of a stick electrode. Indeed, this characteristic of maintaining an arc at low energy is more critical in an electrode which contains a fluxing system, because such system affects the arc stability and makes it more difficult to maintain an arc or plasma at a high arc length. The present invention relates to a method of rating a stick electrode having an outside coating with a flux system, such as a rutile fluxing system.

Figure 1:
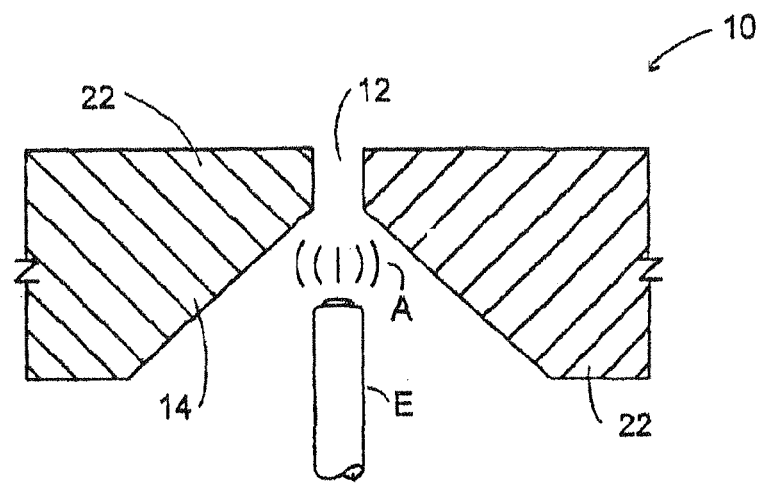
FIG. 1 is an enlarged cross-sectional view showing a set-up for conducting the present method.
Figure 2:
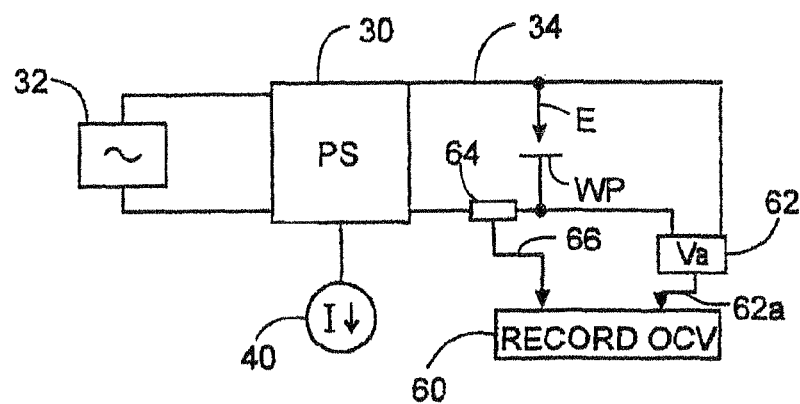
FIGS. 2 and 3 are schematic wiring diagrams of power sources used in performing two different embodiments of the present invention.
Figure 3:
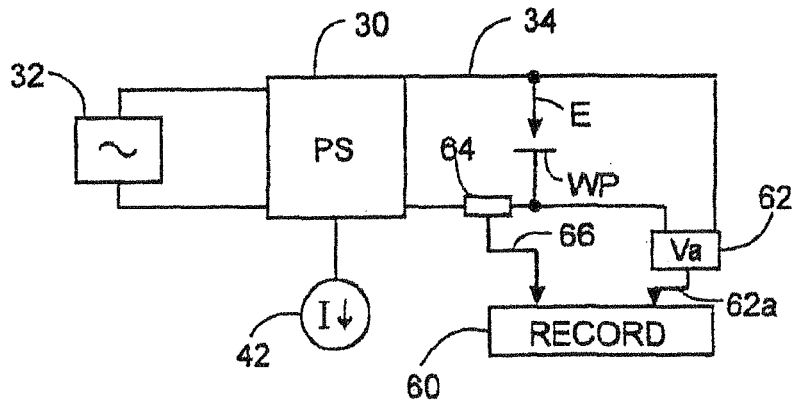

The invention relates to a novel method for rating a stick electrode E for its ability to maintain an arc at low voltages and/or low currents. This is also expressed as low wattage and/or low power. The rating fixture or set-up 10 involves an elongated simulating pipe joint defined by gap 12 and upper groove 14 formed by two spaced plates 20, 22 representing pipe sections. Stick electrode E is schematically illustrated in FIGS. 1-3 and includes an integral fluxing system, preferably a rutile fluxing system. Set-up fixture 10 is used to rate the arc maintaining capabilities of stick electrode E, which ability is an important quality characteristic of a stick electrode used in manual welding. Rating in accordance with the invention involves the ability of the electrode to maintain arc A as the voltage or current is decreased in a manner schematically illustrated in FIG. 2 or when the voltage is decreased as shown in FIG. 3. These two figures each illustrate a standard power source 30 driven by power supply 32 to create waveforms across output leads 34, 36 connected to electrode E and workpiece WP. In FIG. 2, the power source controller includes the capability of decreasing in gradual increments the arc current and recording such decrements as indicated by device 40. In a like manner, as shown in FIG. 3, the controller of power source 30 includes a device 42 for decreasing gradually and recording changes in voltage. Devices 40, 42 of FIGS. 2 and 3, respectively, are used in performing different embodiments of the present invention.

Figure 6:
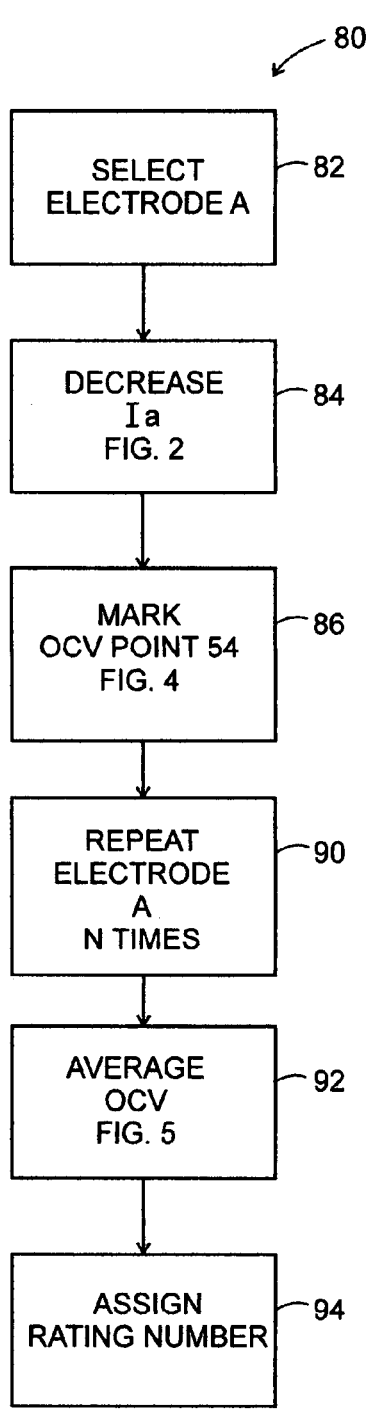
FIG. 6 is a flow chart of the program to perform the method shown in FIGS. 4 and 5.

In accordance with the preferred embodiment of the invention, when welding in DC positive, the testing procedure set forth in FIG. 4 is normally employed wherein device 40 gradually decreases the arc current so a deposition rate decreases along curve 50 from a high starting point 52. As electrode E is moved along groove 14 for welding in the joint between plates 20, 22, device 40 continues to decrease the welding current until arc A is extinguished at OCV point 52. At that point, the open circuit voltage of power source 30 is recorded. This is accomplished by device 60 shown in FIG. 2 wherein the arc voltage is detected by circuit 62 so that the open circuit voltage at point 54 appears as digital information on outlet line 62a. The open circuit condition is sensed by shunt 64, which indicates zero current in line 66 when the arc has been extinguished at point 54. Thus, at point 54 recording device 60, which is a program or circuit, records a digital number indicative of the open circuit voltage at point 54. As shown in column 72 the area of the particular electrodes being rated is recorded. As a further feature, more than one electrode of each type is tested by the method shown in FIG. 4. The number in column 72 is the average open circuit voltage OCV for all electrodes of a given type being rated. Thus, the rating of an electrode is the average open circuit voltage OCV, which average number or value is exhibited in column 74. The number, in digital format, is used for expressing the arc stability characteristic of electrode E as rated by the present method. This novel rating method is performed by program 80 shown in the flow chart of FIG. 6. In this program the electrode to be rated is selected as step 82. Thereafter, the arc current is decremented, as shown in FIG. 2 and represented by step 84. When the point 54 has been reached, the open circuit voltage is identified and recorded by device or program 60, which constitutes step 86. This concludes the actual rating procedure; however, in the preferred embodiment, and as a further feature, several electrodes are processed to obtain an average open circuit voltage. This is indicated by step 90 wherein several electrodes A are processed to obtain several points 54. The total value of the several values for the open circuit voltage at points 54 of the electrodes is averaged as indicated in FIG. 5, and represented by step 92 in FIG. 6. Then, program 80 assigns a rating number to the electrode as indicated by step 94. This rating number is recorded in column 74 of FIG. 5 to evaluate the arc maintaining capabilities of various competitive electrodes. The preferred and most simplified embodiment of the present invention is the method using the machine of FIG. 2 to perform the procedures illustrated in FIGS. 4-6; however, other methods can be used for determining the low energy arc stability of a stick electrode.

Converting the open circuit voltage value at point 54 into an energy rating number is accomplished by circuit EC in FIG. 6A. Circuit EC is used to determine and record the combination of the current and open circuit voltage when the arc is extinguished at point 54. The lowest energy required to maintain an arc is determined by circuit EC where the current on line 66 is directed to a holding circuit 100, so output line 102 has a number representing the current at point 54. This number is one input to multiplier 110. The other input is a number representing the open circuit voltage at point 54. The second number appears on line 62a. These two numbers or values are multiplied to provide a watt calculation on line 112. This calculation gives a digital number referred to as the "energy" rating number and it is recorded in register 120. Thus, after performing the rating method illustrated in FIG. 4, resulting data from FIG. 2 is processed by circuit EC to give an energy rating for electrode E. The electrode will lose its welding arc at an energy below the energy recorded in register 120. This recorded number is a stability characteristic of electrode E. It indicates the ability to withstand large arc lengths and deviations in arc current. The rating method is described in FIG. 4 and an evaluation technique for this data is performed by circuit EC of FIG. 6A.

Figure 7:
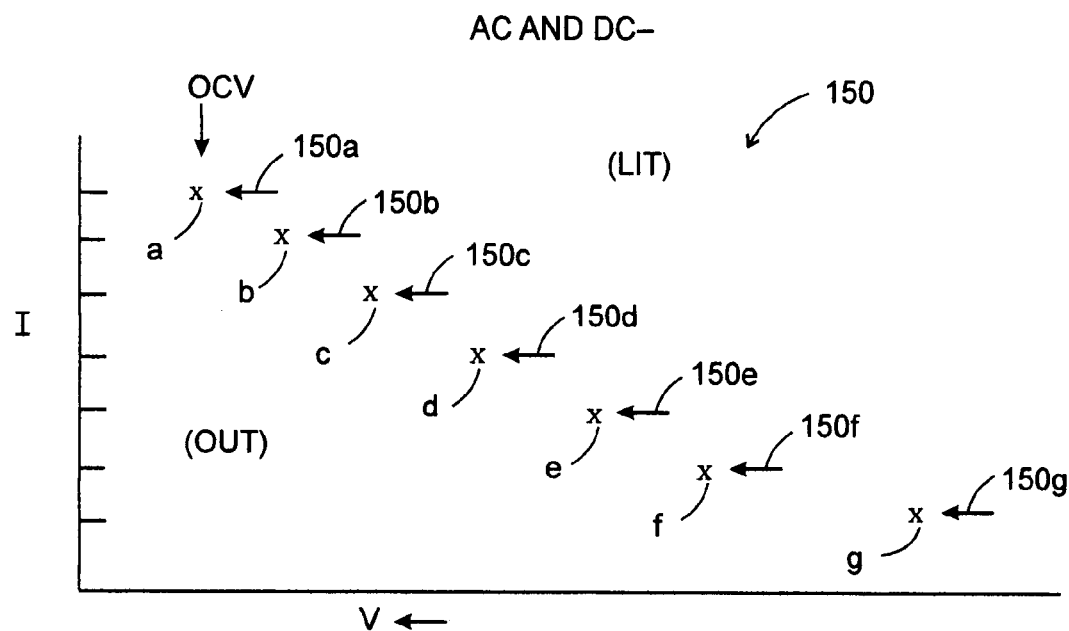
FIG. 7 is a graph illustrating another embodiment of the present invention utilizing a constant current concept for AC and DC positive welding, wherein OCV points are located for use in plotting a curve representing the characteristics of a stick electrode.

Another embodiment for rating a stick electrode by the power or energy that will no longer sustain an arc is illustrated in FIGS. 7-11. This embodiment is especially applicable for AC welding and DC negative welding and uses the machine shown in FIG. 3. This machine has the features of the machine in FIG. 2 with device 42 for incrementally reducing the welding voltage while maintaining the welding current constant. This embodiment of the invention is schematically illustrated in FIG. 7 where the rating method generates graph 150. This graph is created by holding the welding current constant at a given value and then decreasing the arc voltage by device 42. The arc voltage is directed to program or device 60 from voltage detector 62 on line 62a. A series of procedures are performed in rating electrode E. These procedures each involve holding the arc current constant and reducing the arc voltage until the arc energy does not sustain the plasma column or arc. These procedures are shown as separate procedures 150a-150g to determine the points a-g at which the energy of the arc is insufficient to maintain the arc. Consequently, at each current of the procedures 150a-150g an open circuit voltage point a-g is determined. These points are plotted as curve 200 of FIG. 8 for electrode E1. This curve is plotted by using the data created by the method described in FIG. 7. Testing of electrode E1 generates data points to plot curve 200. Other electrodes E2, E3 are processed by the method in FIG. 7 to plot curve 202 and curve 204. These curves have an integrated area 210 under the curve, which area encompasses all energy levels where the electrode can not sustain an arc. Each energy level is a product of current and voltage and is the same as the output of circuit EC shown in FIG. 6A. Consequently, the area under the curves determine the quality characteristic of each electrode. The area represents the ability to sustain a welding arc at low energy levels. Areas A1, A2 and A3 are set forth in column 222 of table 220 as they relate to and correlate with electrodes E1, E2 and E3 in column 222 of table 220. The evaluation of the electrodes as compared to each other is the numerical value established by the area under the curve shown in FIG. 8 and is recorded on table 220 in FIG. 9. In another rating procedure using calculated areas, the different electrodes are compared by a program performing the algorithm of the conversion chart 230 in FIG. 10. Several electrodes are processed in accordance with the method in FIG. 7 to establish the area under the plotted curve, as disclosed in FIG. 8. The summation of all of these areas for a given electrode is then divided by the number of electrodes tested. This data manipulation generates a digital number recorded in column 236 of chart 230. The recorded number relates to the electrodes in column 232 by executing the intermediate calculation in column 234. The relative quality of the individual electrodes is the number in column 224 of table 220 or the number in column 236 of conversion chart 230. This rating technique or method is performed using the basic concept shown in FIG. 4 as further set forth and modified in FIG. 7.

Figure 11:
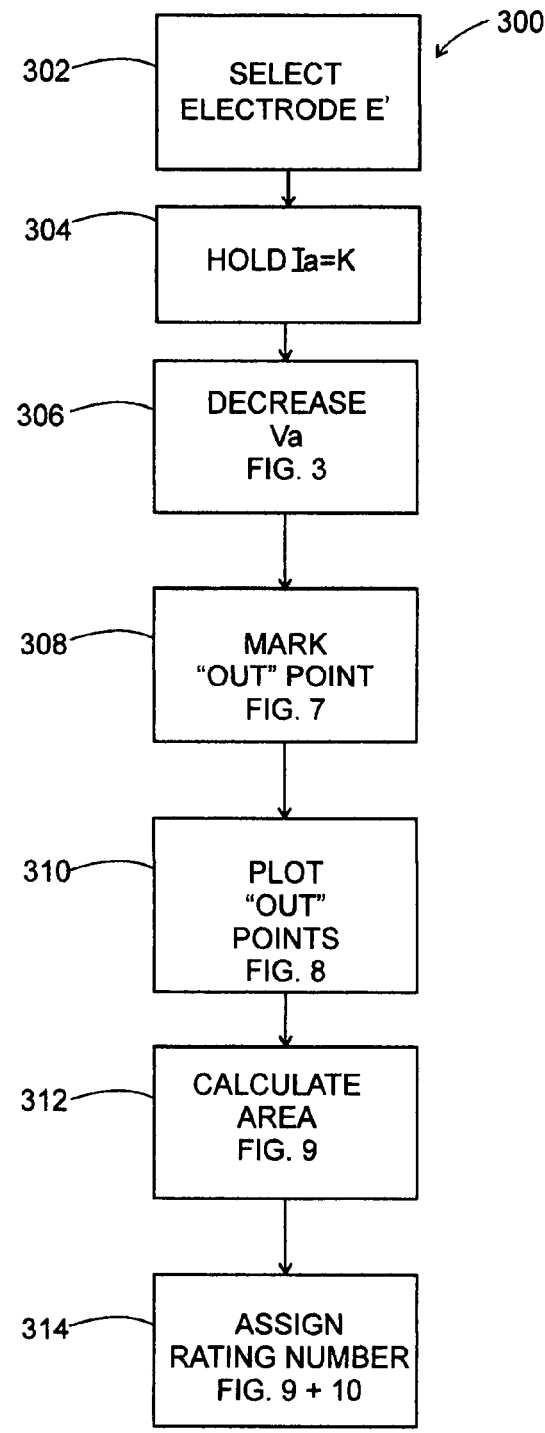
FIG. 11 is a flow chart of the program to perform the method schematically illustrated in FIGS. 7-10; and, FIG. 12 is a voltage current graph illustrating a simplified embodiment of the method for rating a stick electrode.
Figure 8:
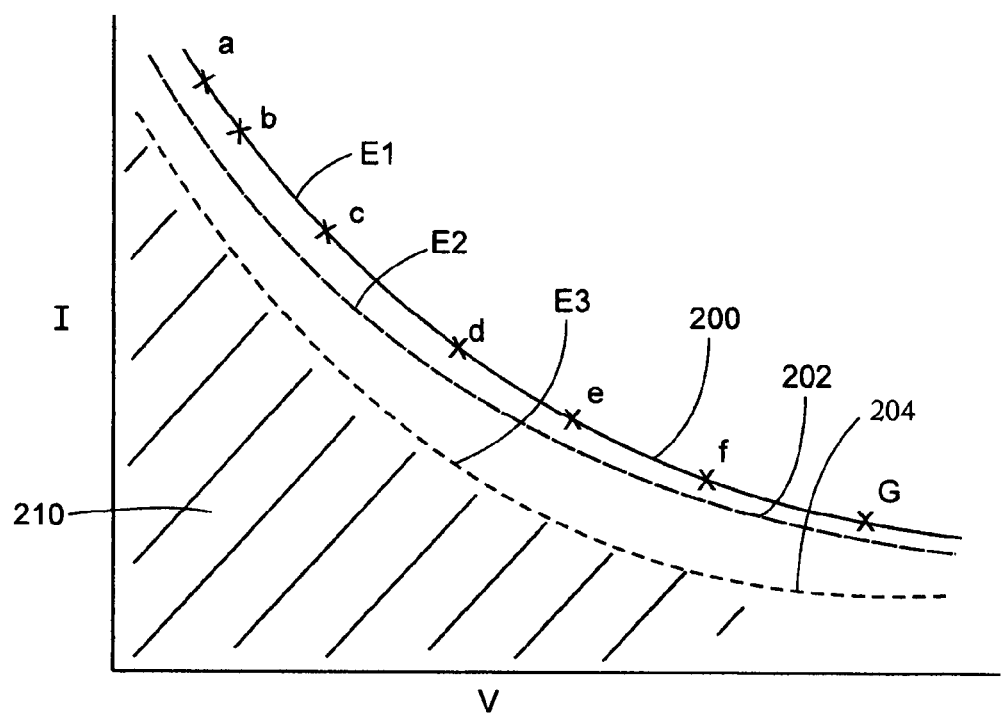
FIG. 8 is a graph of voltage versus current for several different stick electrodes using an analysis of the results of the invention as illustrated in FIG. 7.
Figure 9:
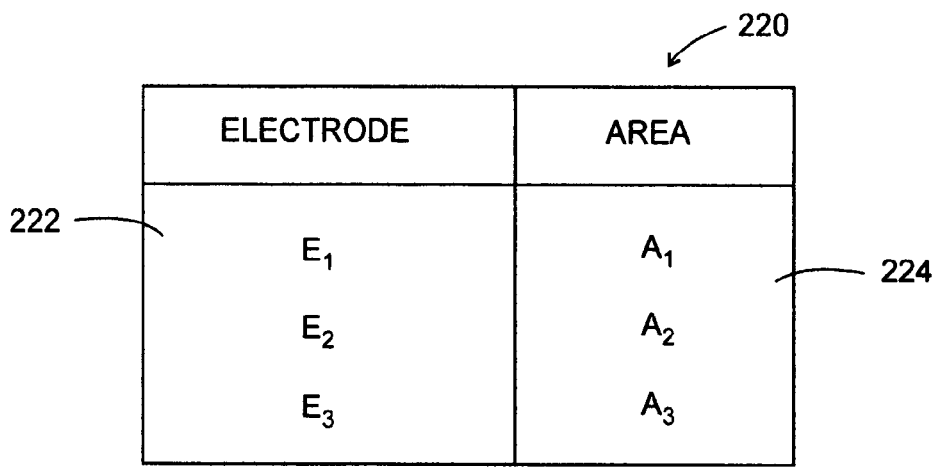
FIG. 9 is a table tabulating the results of the rating procedure and method of FIGS. 7 and 8.
Figure 10:
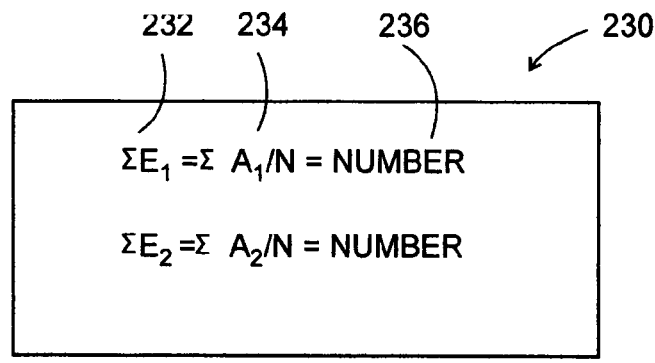
FIG. 10 is a table tabulating a further analysis step employed by the invention as described in FIGS. 7-9.

A flow chart of program 300 for the embodiment of the invention shown in FIG. 7 is shown in FIG. 11. Step 302 involves selecting the electrode to be evaluated. In step 304, a constant current is maintained at one of the several procedures set forth in FIG. 7. Step 304 is then followed by step 306 wherein the arc voltage is decreased by device 42 shown in FIG. 3 to create one of the "out" points a-g of graph 150. As illustrated in FIG. 8, step 310 involves plotting the curves 200, 202 or 204 based upon the determined open circuit points a-g. Step 212 then calculates the area under a curve by an algorithm, as explained in connection with table 220. This process step assigns a rating number at step 314. This rating number is either the area of column 224 in FIG. 9 or the calculated number for the average area in column 236 of FIG. 10. The embodiment of the invention illustrated in FIGS. 7-10 utilizes the basic concept of reducing either the current or the voltage to determine the open circuit voltage or the point in which the arc energy will not sustain an arc. This determination of the open circuit voltage or arc sustaining energy is expressed in an assigned number to rate the quality of the electrode. There are other processes for employing the concept of measuring the sustaining power or energy of the arc for a given electrode to rate an electrode.

Figure 12:
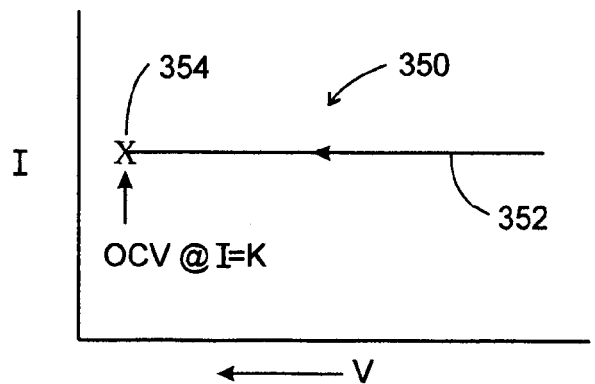

The procedure in FIG. 4 is a single procedure wherein the current is reduced until the arc plasma is no longer sustained. This same simple one step procedure is used many times in the rating method of FIG. 7. This one step concept is schematically shown in FIG. 12 wherein procedure 350 is like one of the several procedures 150a-150g. The arc current is held constant at a value K and the arc voltage is reduced along line 352 until the arc is extinguished at point 354. This is the method of FIG. 4, but using voltage. These procedures determine the wattage, or more simply the open circuit voltage, at which the arc is no longer sustainable. This value is used in determining the quality of a stick electrode.

Having thus defined the invention, the following is claimed:

1. A method of representing arc maintainability of an electric arc welding stick electrode for depositing molten metal from said electrode onto a workpiece by using an arc between said electrode and said workpiece, said arc caused by a voltage from a power source where said voltage creates a current of said arc, said method comprising:
    (a) creating said arc between said electrode and said workpiece;
    (b) moving said electrode along said workpiece while maintaining said arc;
    (c) decreasing either said current or said voltage until a point is reached where said arc is extinguished, wherein said point corresponds to an open circuit voltage, and wherein said open circuit voltage is the voltage at said point where said arc is extinguished with a zero current value which corresponds to said current of said arc at said point where said arc is extinguished;
    (d) determining an open circuit voltage of said power source at said point where said arc is extinguished; and,
    (e) rating said electrode based upon said open circuit voltage at said point where said arc is extinguished by assigning digital information.

2. The method as defined in claim 1 wherein said decreasing relates to the current of said arc.

3. The method as defined in claim 2 wherein said voltage is DC positive.

4. A method as defined in claim 1 wherein said decreasing relates to said arc voltage.

5. A method as defined in claim 4 wherein said voltage is DC negative.

6. A method as defined in claim 4 wherein said voltage is AC.

7. A method as defined in claim 6 wherein said rating includes:
    (f) obtaining said point for N electrodes;
    (g) adding the values of said N points to obtain a total; and,
    (h) using said total to rate said electrodes.

8. A method as defined in claim 7 wherein said total is divided by N before being used to rate said electrodes.

9. A method as defined in claim 5 wherein said rating includes:
    (f) obtaining said point for N electrodes;
    (g) adding the values of said N points to obtain a total; and,
    (h) using said total to rate said electrodes.

10. A method as defined in claim 9 wherein said total is divided by N before being used to rate said electrodes.

11. A method as defined in claim 4 wherein said rating includes:
    (f) obtaining said point for N electrodes;
    (g) adding the values of said N points to obtain a total; and,
    (h) using said total to rate said electrodes.

12. A method as defined in claim 11 wherein said total is divided by N before being used to rate said electrodes.

13. The method as defined in claim 3 wherein said rating includes:
    (f) obtaining said open circuit voltage at said point for several electrodes;
    (g) adding values of said open circuit voltage at said points for several electrodes to obtain a total value; and,
    (h) using said total value to rate said several electrodes.

14. The method as defined in claim 13 wherein said total value is divided by a numerical quantity of said several electrodes before being used to rate said several electrodes.

15. The method as defined in claim 2 wherein said rating includes:
    (f) obtaining said open circuit voltage at said point for several electrodes;
    (g) adding values of said open circuit voltage at said points for several electrodes to obtain a total value; and,
    (h) using said total value to rate said several electrodes.

16. The method as defined in claim 15 wherein said total value is divided by a numerical quantity of said several electrodes before being used to rate said several electrodes.

17. The method as defined in claim 1 wherein said rating includes:
    (f) obtaining said open circuit voltage at said point for several electrodes;
    (g) adding values of said open circuit voltage at said points for several electrodes to obtain a total value; and,
    (h) using said total value to rate said several electrodes.

18. The method as defined in claim 17 wherein said total value is divided by a numerical quantity of said several electrodes before being used to rate said several electrodes.

19. A method as defined in claim 4 including:
(f) reducing said voltage for each of several arc currents whereby said points create a plotted curve;
(g) calculating the area below said plotted curve; and,
(h) rating said electrode based upon said calculated area.

20. A method as defined in claim 19 wherein said voltage is DC negative.

21. A method as defined in claim 19 wherein said voltage is AC.

22. A method as defined in claim 5 wherein said stick electrode has an outer coating containing a fluxing system.

23. A method as defined in claim 22 wherein said fluxing system is rutile based.

24. A method as defined in claim 4 wherein said stick electrode has an outer coating containing a fluxing system.

25. A method as defined in claim 24 wherein said fluxing system is rutile based.

26. The method as defined in claim 1 wherein said electrode has an outer coating containing a fluxing system.

27. The method as defined in claim 26 wherein said fluxing system is rutile based.

* * * * *

UNITED STATES PATENT AND TRADEMARK OFFICE
CERTIFICATE OF CORRECTION

| | |
|---|---|
| PATENT NO. | : 8,049,141 B2 |
| APPLICATION NO. | : 11/879564 |
| DATED | : November 1, 2011 |
| INVENTOR(S) | : Jonathan Sterling Ogborn et al. |

It is certified that error appears in the above-identified patent and that said Letters Patent is hereby corrected as shown below:

Column 3, line 29, "OCV point 52" should be "OCV point 54"

Signed and Sealed this
Twenty-seventh Day of December, 2011

David J. Kappos
*Director of the United States Patent and Trademark Office*